UNITED STATES PATENT OFFICE.

RUPERT GREVILLE-WILLIAMS, OF ALBANY, NEW YORK, ASSIGNOR TO THE ALBANY COAL TAR DYE AND CHEMICAL COMPANY, OF SAME PLACE.

PROCESS OF MAKING DYES.

SPECIFICATION forming part of Letters Patent No. 412,148, dated October 1, 1889.

Application filed June 6, 1889. Serial No. 313,386. (No specimens.)

*To all whom it may concern:*

Be it known that I, RUPERT GREVILLE-WILLIAMS, a subject of Her Majesty the Queen of Great Britain, and residing at the city of Albany, in the county of Albany and State of New York, have invented certain new and useful Improvements in Processes for the Production of Coloring-Matter; and I do hereby declare that the following is a full, clear, and exact description of the invention, which will enable others skilled in the art to which it appertains to make and use the same.

My invention relates to the production of new coloring-matters which dye unmordanted cotton in an alkaline or soap bath, and which coloring-matters are obtained by combining one molecule of a tetrazo compound with two molecules of the alkalized acids of the orchilla lichens or compounds of the same. The alkalized acids referred to can be prepared by treating the orchilla lichens for a short time with water in presence of lime, and after filtering precipitating the orsellinic and other acids by means of hydrochloric acid. The acids of the lichens thus obtained in the form of a jelly are filtered off and dried at a low temperature. They are then boiled with various alcohols to produce the corresponding alkalized derivatives. The alkalized acids may be as well prepared by treating the lichens directly with the alcohols. I do not bind myself to these or any other methods for producing the alkalized lichen acids, as my invention does not relate to their production, but to the colors obtained by their use.

By tetrazo compounds I mean tetrazo-diphenyl and its homologues, tetrazo-naphthyalene, tetrazo-stilbene, tetrazo-fluorene, tetrazo-diphenol ether, tetrazo-azobenzole and its homologues, tetrazo-oxydiphenyl, as well as the alkalized compounds or the sulpho or carbo acids of the same.

The following examples will be sufficient to show how I practically carry out my invention:

*Example No. 1.*—Twenty-eight pounds of benzidine sulphate or its equivalent of the base are converted into the tetrazo compound in the usual and well-known manner. This solution is then run slowly into 36.4 pounds of the methylated acids of the lichens and one hundred pounds of caustic soda dissolved in one hundred gallons of water. The color is immediately formed and is salted out, pressed, and dried. This color dyes a fine scarlet shade on unmordanted cotton in an alkaline or soap bath. The formula is as follows:

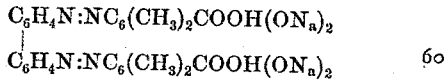

*Example No. 2.*—If the twenty-eight pounds of benzidine sulphate in Example No. 1 be replaced by 30.2 pounds of tolidine sulphate, a fine saffranine shade of color is produced.

Having thus described my invention, what I claim is—

The process for the production of new coloring-matters by combining one molecule of tetrazo-diphenyl or one molecule of one of the other herein-mentioned tetrazo compounds with two molecules of an alkalized acid of the orchilla lichens or halogen or sulpho compounds of the same, substantially as set forth.

RUPERT GREVILLE-WILLIAMS.

Witnesses:
 HOWARD S. NEIMAN,
 R. A. SHAW.

It is hereby certified that in Letters Patent No. 412,148, granted October 1, 1889, upon the application of Rupert Greville-Williams, of Albany, New York, for an improvement in "Process of Making Dyes," the word "alkalized" wherever it appears throughout the printed specification and claim should read *alkylized;* and that the said Letters Patent should be read with these corrections therein that the same may conform to the record of the case in the Patent Office.

Signed, countersigned, and sealed this 22d day of October, A. D. 1889.

[SEAL.]
CYRUS BUSSEY,
*Assistant Secretary of the Interior.*

Countersigned:
C. E. MITCHELL,
*Commissioner of Patents.*